United States Patent
Coleridge et al.

(10) Patent No.: US 12,363,083 B2
(45) Date of Patent: Jul. 15, 2025

(54) SYSTEM AND METHOD FOR USE OF FILTERS WITHIN A CRYPTOGRAPHIC PROCESS

(71) Applicant: CHOL, Inc., Irvine, CA (US)

(72) Inventors: Robert Coleridge, Bellingham, WA (US); Richard Blech, Irvine, CA (US); Michael Feinberg, Newport Beach, CA (US)

(73) Assignee: CHOL, Inc., Irvine, CA (US)

( * ) Notice: Subject to any disclaimer, the term of this patent is extended or adjusted under 35 U.S.C. 154(b) by 0 days.

(21) Appl. No.: 18/468,484

(22) Filed: Sep. 15, 2023

(65) Prior Publication Data
US 2024/0267365 A1    Aug. 8, 2024

Related U.S. Application Data

(63) Continuation of application No. 17/456,721, filed on Nov. 29, 2021, now Pat. No. 11,765,147, which is a
(Continued)

(51) Int. Cl.
*H04L 29/06* (2006.01)
*H04L 9/06* (2006.01)
(Continued)

(52) U.S. Cl.
CPC .......... *H04L 63/0478* (2013.01); *H04L 9/065* (2013.01); *H04L 9/16* (2013.01); *H04L 63/0457* (2013.01)

(58) Field of Classification Search
CPC ... H04L 63/0478; H04L 63/0457; H04L 9/16; H04L 9/065
See application file for complete search history.

(56) References Cited

U.S. PATENT DOCUMENTS 5,003,596 A    3/1991 Wood
5,623,548 A    4/1997 Akiyama et al.
(Continued)

FOREIGN PATENT DOCUMENTS

WO    WO 2016/204846 A2    12/2016

OTHER PUBLICATIONS

Razi Hosseinkhani et al., "Using Cipher Key to Generate Dynamic S-Box in AES Cipher System", International Journal of Computer Science and Security (IJCSS); vol. 5 Issue 1; pp. 19-28; Feb. 2012.

*Primary Examiner* — Ellen Tran
(74) *Attorney, Agent, or Firm* — Knobbe, Martens, Olson & Bear, LLP (57) ABSTRACT

A method for encrypting plaintext data is enclosed that includes operations of receiving the plaintext data, the plaintext data including a plurality of data portions, encrypting each of the plurality of data portions using a specific key for each data portion, merging each of the plurality of data portions together to form a single data stream, generating a data map of the single data stream, appending the data map to the single data stream, and performing a master cipher to form an encrypted distributable stream. Operations of the encrypting include: an additive operation on each byte of the first data portion using the additive table, an XOR operation on each byte of the first data portion as modified by the additive operation, a substitution operation on each byte of the first data portion using the substitution table as modified by the XOR operation.

18 Claims, 9 Drawing Sheets

Related U.S. Application Data continuation of application No. 16/245,185, filed on Jan. 10, 2019, now Pat. No. 11,190,498.

(60) Provisional application No. 62/616,318, filed on Jan. 11, 2018.

(51) Int. Cl.
*H04L 9/16* (2006.01)
*H04L 9/40* (2022.01)

(56) References Cited

U.S. PATENT DOCUMENTS

| | | |
|---|---|---|
| 6,246,768 B1 | 6/2001 | Kim |
| 8,014,526 B2 | 9/2011 | Billhartz et al. |
| 2003/0210787 A1 | 11/2003 | Billhartz et al. |
| 2004/0203591 A1 | 10/2004 | Lee |
| 2006/0129545 A1 | 6/2006 | Golle et al. |
| 2006/0227974 A1 | 10/2006 | Haraszti |
| 2007/0219915 A1 | 9/2007 | Hatano et al. |
| 2009/0208006 A1 | 8/2009 | Candelore |
| 2009/0220071 A1 | 9/2009 | Gueron et al. |
| 2010/0067687 A1 | 3/2010 | Chandramouli et al. |
| 2013/0073850 A1 | 3/2013 | Zaverucha |
| 2013/0236112 A1 | 9/2013 | Oka et al. |
| 2013/0237278 A1 | 9/2013 | Oka et al. |
| 2015/0033016 A1 | 1/2015 | Thornton et al. |
| 2015/0278634 A1 | 10/2015 | Kato et al. |
| 2015/0304102 A1 | 10/2015 | Nakano et al. |
| 2015/0310219 A1* | 10/2015 | Haager ............... H04L 9/0869 713/165 |
| 2017/0085371 A1 | 3/2017 | Coleridge |

* cited by examiner

SYSTEM AND METHOD FOR USE OF FILTERS WITHIN A CRYPTOGRAPHIC PROCESS

CROSS-REFERENCE TO RELATED APPLICATIONS

This application is a continuation of U.S. patent application Ser. No. 17/456,721, filed Nov. 29, 2021, which is a continuation of U.S. patent application Ser. No. 16/245,185, filed Jan. 10, 2019, which claims priority to U.S. Provisional Application No. 62/616,318, filed Jan. 11, 2018, the entire contents of each of which are incorporated by reference herein.

EXPORT CONTROL

Information in this patent application is controlled by the U.S. Government and authorized for access only by U.S. persons and licensed non-U.S. persons. Please contact the assignee, CHOL, Inc., for further guidance if you wish to give access to the subject application to a non-U.S. person. This statement attaches to any use or incorporation of said patent application into other applications or any other use.

FIELD

Embodiments of the disclosure generally relate to cryptographic techniques. More particularly, one embodiment is directed to a cryptographic technique that utilizes a plurality of keys during encryption of a data stream to enable distribution of the encrypted data stream to a plurality of third-parties with each provided selective access to various portions of the encrypted data stream.

GENERAL BACKGROUND

Today, digital data has become an ever increasing component of everyday lives. Digital data is used to communicate, complete financial transactions and to store personal information. As such digital data becomes a more significant component in today's world, the ability to protect such digital data from improper usage by third parties becomes imperative. To provide such protection, users frequently turn to cryptography.

In one form, cryptography is the art and science of preparing, transmitting and reading messages in a form intended to prevent the message from being read by those not privy to secrets associated with the form. Cryptography is practiced in and widely appreciated for a wide array of applications, including gaming, computer security, healthcare information security, banking information security, military communications, mathematics, intellectual property protection and many others.

Encryption today is typically the conversion or encoding of a data stream, file, etc., ("plaintext") from a first state that is readable to a second version that is "hidden" using an encryption algorithm, also referred to as a cipher. In order to be read, the second version must be decrypted using a key, e.g., a password, and cannot be read without having certain information (i.e., the password), which is provided only to authorized parties. Therefore, a data stream containing multiple types of data, e.g., various documents, health data, employment information, banking information, credit information, etc., may be encrypted using a single cipher and produce an encrypted data stream that is able to be decrypted by a single key.

However, such a single encrypted data stream is inconvenient when it is desired that various parties are to be supplied authorization to only portions of the encrypted data stream. For example, information relevant to a single individual may be included in a single data stream and comprise information such as health data, banking data, credit data, employment data, etc. In such an instance, a single encrypted data stream is inconvenient as providing the key to decrypt the data to, e.g., a medical profession, provides authorization to the entire encrypted data stream and information to which he or she is not authorized (e.g., banking data).

Therefore, what is needed is an inventive technique, technology, system and method for encrypting portions of a single data stream with portion-specific ciphers thereby enabling the single encrypted data stream to be transmitted to multiple third-parties wherein each third-party's key provides access to only information to which they are authorized.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Various embodiments of the disclosure relate to selective access encryption techniques. More specifically, some embodiments are directed to techniques that include the encryption of a data stream that is comprised of a plurality of data portions. As authorization to each data portion may be provided to only select third-parties (e.g., medical professions receive authorization to health data while banks receive authorization to finance or banking data), each data portion may be encrypted with a specific key that is provided to only the necessary third-parties. Thus, the privacy of each data portion may be maintained toward unauthorized third-parties even though a single data stream including all data portions is distributed. Thus, a technological improvement of the invention of the disclosure is providing a single distributable data stream formed from a plurality of data portions, each able to be decrypted with its own specific key. As a result, the privacy of each data portion is maintained when distributing all data portions as a single distributable stream.

As an analogy, a camera may capture a scene that illustrates a first image. However, with the application of different lenses, the scene may be filtered to display various images. For example, the application of colored lenses on a camera results in the capturing of images that vary in color, thus, depicting different data. To further the example, a polarized filter may be applied to the camera resulting in yet a different image of the same scene. Specifically, with respect to photography, polarized filters are known to darken skies, manage reflections and suppress glare by allowing certain light waves to pass through the filter while blocking others. At a high-level, embodiments of the disclosure are analogous in that a data stream comprised of a plurality of data portions is encrypted such that each data portion is encrypted with a specific and unique key (e.g., filter). Thus, the decryption of the data stream using a first key will only reveal information encrypted in a manner to be decrypted with the first key. Additionally, decryption of the same data stream using a second key only reveal information encrypted in a manner to be decrypted with the first key.

As a general illustrative example embodiment, a system is disclosed that is configured to receive data and encrypt the data. Specifically, the data is comprised of a plurality of data portions that are merged together to form a data stream. As in initial step, each of the data portions is encrypted by the system using specific keys for each data portion. Following the encryption of each data portion, the data portions are merged to form a single data stream. Subsequent to the merger, the system generates a data map of the single data stream that indicates the location of each encrypted data portion within the single data stream. The system then appends the data map to the single data stream.

Once the data map has been appended to the single data stream, e.g., forming a single data block, the system performs a master cipher on the single data block to form an encrypted distributable stream. The encrypted distributable stream may then be distributed to a plurality of third-parties each being authorized to access only select data portions within the encrypted distributable stream. For instance, a medical profession may be providing selective access to the data map and a data portion including health data while a credit bureau is provided selective access to the data map and a data portion including credit data.

The present application is related to the U.S. patent application Ser. No. 15/082,853 entitled System and Method for an Enhanced XOR Cipher Through Extensions," filed Mar. 28, 2016, the entire contents of which are hereby incorporated by reference. Specifically, some embodiments of the disclosure utilize the Enhanced XOR Cipher Through Extensions (EXCITE) cryptographic technique in some operations of the novel cryptographic technique described herein. Specifically, embodiments of the disclosure may modify and improve operations of the EXCITE cryptographic technique, some embodiments may remove steps from the EXCITE cryptographic technique while other embodiments may add steps to the EXCITE cryptographic technique. The EXCITE cryptographic technique described in U.S. patent application Ser. No. 15/082,853 is merely directed to a fast and highly secure cipher, whereas embodiments of the disclosure are directed to selective access encryption techniques that generate an encrypted data stream that is distributable to a plurality of third-parties each being provided selective access to only particular portions of the encrypted data due to the use of a plurality of specific keys used during the encryption process.

I. Terminology

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory (computer-readable) storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "computerized" generally represents that any corresponding operations are conducted by hardware in combination with software and/or firmware.

The term "message" generally refers to information in a prescribed format and transmitted in accordance with a suitable delivery protocol such as Hypertext Transfer Protocol (HTTP), HTTP Secure (HTTPS), Simple Mail Transfer Protocol (SMTP), iMessage, Post Office Protocol (POP), Instant Message Access Protocol (IMAP), or the like. Hence, each message may be in the form of one or more packets, frames, or any other series of bits having the prescribed format. Messages may correspond to HTTP data transmissions, email messages, text messages, or the like.

In certain instances, the terms "compare," comparing," "comparison," or other tenses thereof generally mean determining if a match (e.g., a certain level of correlation) is achieved between two items where one of the items may include a particular pattern.

The term "process" may include an instance of a computer program (e.g., a collection of instructions, also referred to herein as an application). In one embodiment, the process may be comprised of one or more threads executing concurrently (e.g., each thread may be executing the same or a different instruction concurrently).

The term "processing" may include execution of a binary or launching an application wherein launching should be interpreted as placing the application in an open state and, in some implementations, performing simulations of actions typical of human interactions with the application. For example, the application, an internet browsing application, may be processed such that the application is opened and actions such as visiting a website, scrolling the website page, and activating a link from the website are performed (e.g., the performance of simulated human interactions).

The term "object" generally relates to content having a logical structure or organization that enables it to be classified for purposes of analysis for malware. The content may include an executable (e.g., an application, program, code segment, a script, dynamic link library (dll) or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, web page, etc.), or simply a collection of related data. The object may be retrieved from information in transit (e.g., a plurality of packets) or information at rest (e.g., data bytes from a storage medium). Examples of different types of objects may include a data element, one or more flows, or a data element within a flow itself.

The term "network device" should be construed as any electronic device with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, standalone appliance, a router or other intermediary communication device, etc. Other examples of a network device include a computing node, namely hardware and/or software that operates to receive information, and when applicable, perform malware analysis on that information. The term "endpoint device" as used herein should be construed to be any network device that is communicatively coupled to the enterprise search system via the network. For purposes of clarity, an electronic device of an administrator will be referred to as a network device while other electronic devices communicatively coupled to the enterprise search system will be referred to as endpoint devices, though all such endpoint devices constitute network devices.

The term "transmission medium" may be construed as a physical or logical communication path between two or more electronic devices (e.g., any devices with data processing and network connectivity such as, for example, a sensor, a computing node, mainframe, a computer such as a desktop or laptop, netbook, tablet, firewall, smart phone, router, switch, bridge, etc.) or between components within an electronic device. For instance, as a physical communication path, wired and/or wireless interconnects in the form of electrical wiring, optical fiber, cable, bus trace, or a wireless channel using infrared, radio frequency (RF), may be used.

The term "key" refers to information used as part of encryption and decryption processes. A key may be any information that is used as input to an encryption algorithm, which may also be referred to as a cipher. The key is not limited in form and may be, for example, alphabetical, numerical, alphanumerical, hexadecimal, binary, etc.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Selective Access Encryption ("LENS") System

Figure 1:
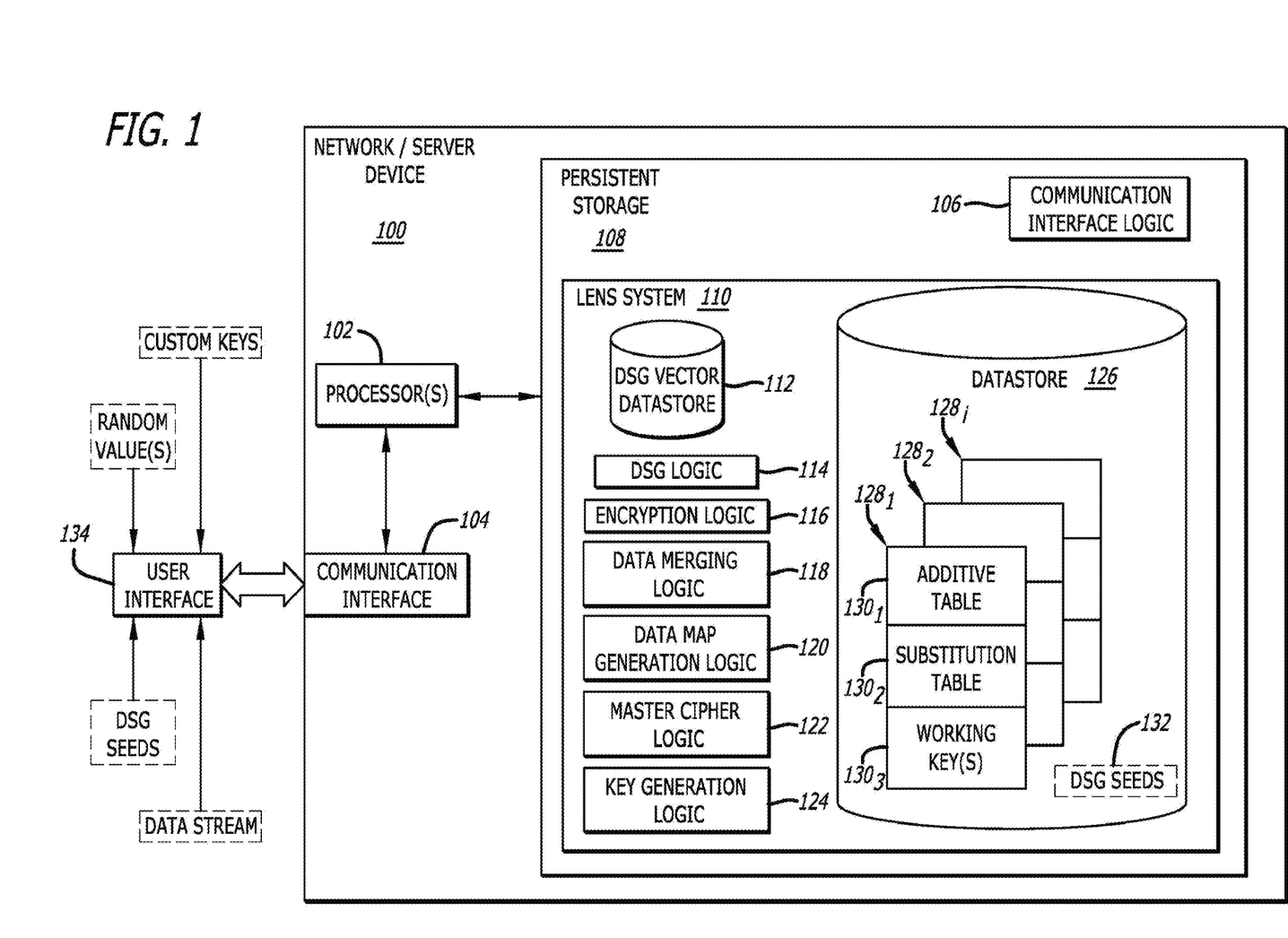
FIG. 1 is an exemplary embodiment of a logical representation of a LENS system in accordance with some embodiments.

Referring now to FIG. 1, an exemplary embodiment of a logical representation of the selective access encryption ("LENS") system is shown in accordance with some embodiments. The moniker "LENS" comes from an analogy to the filter discussion above, wherein providing selective access to portions of the encrypted data stream third-parties is analogous to providing various filters in photography. The LENS system 110 may be stored on persistent storage 108 of a network/server device 100, which may include a housing that protects circuitry within the housing, namely one or more processors 102 that are coupled to a communication interface 104, which, in combination with a communication interface logic 106, enables communications with external network devices, endpoint devices and/or other network appliances. According to one embodiment of the disclosure, the communication interface 104 may be implemented as a physical interface including one or more ports for wired connectors. Additionally, or in the alternative, the communication interface 104 may be implemented with one or more radio units for supporting wireless communications with other electronic devices. The communication interface logic 106 may include logic for performing operations of receiving and transmitting one or more objects via the communication interface 104 to enable communication between the LENS system 110 and one or more endpoint devices via a network (e.g., the internet or a LAN) and/or cloud computing services.

The processor(s) 102 is further coupled to the persistent storage 108 (a non-transitory computer-readable medium), and according to one embodiment, the persistent storage 108 may include: (i) a DSG logic 114, (ii) an encryption logic 116, (iii) a data merging logic 118, (iv) a data map generation logic 120, (v) a master cipher logic 122, and (vi) a key generation logic 124. The LENS system 110 may also include, and stored therewith, a data store 126, which may store a plurality of data sets $128_1$-$128_i$ once the data sets $128_1$-$128_i$ have been generated, wherein each data set may include an additive table $130_1$, a substitution table $130_2$ and one or more working keys $130_3$ (herein, the key(s) collectively will be referred to as "working keys $130_3$"). The data store 126 may also store the DSG seeds 132. However, one or both of the DSG vector data store 112 and the data store 126 may be located remotely from the LENS system 110. Of course, when implemented as hardware, one or more of these logic units could be implemented separately from each other. The functionality of each logic module is discussed in further detail below.

III. Exemplary Data Flow

Figure 2A:
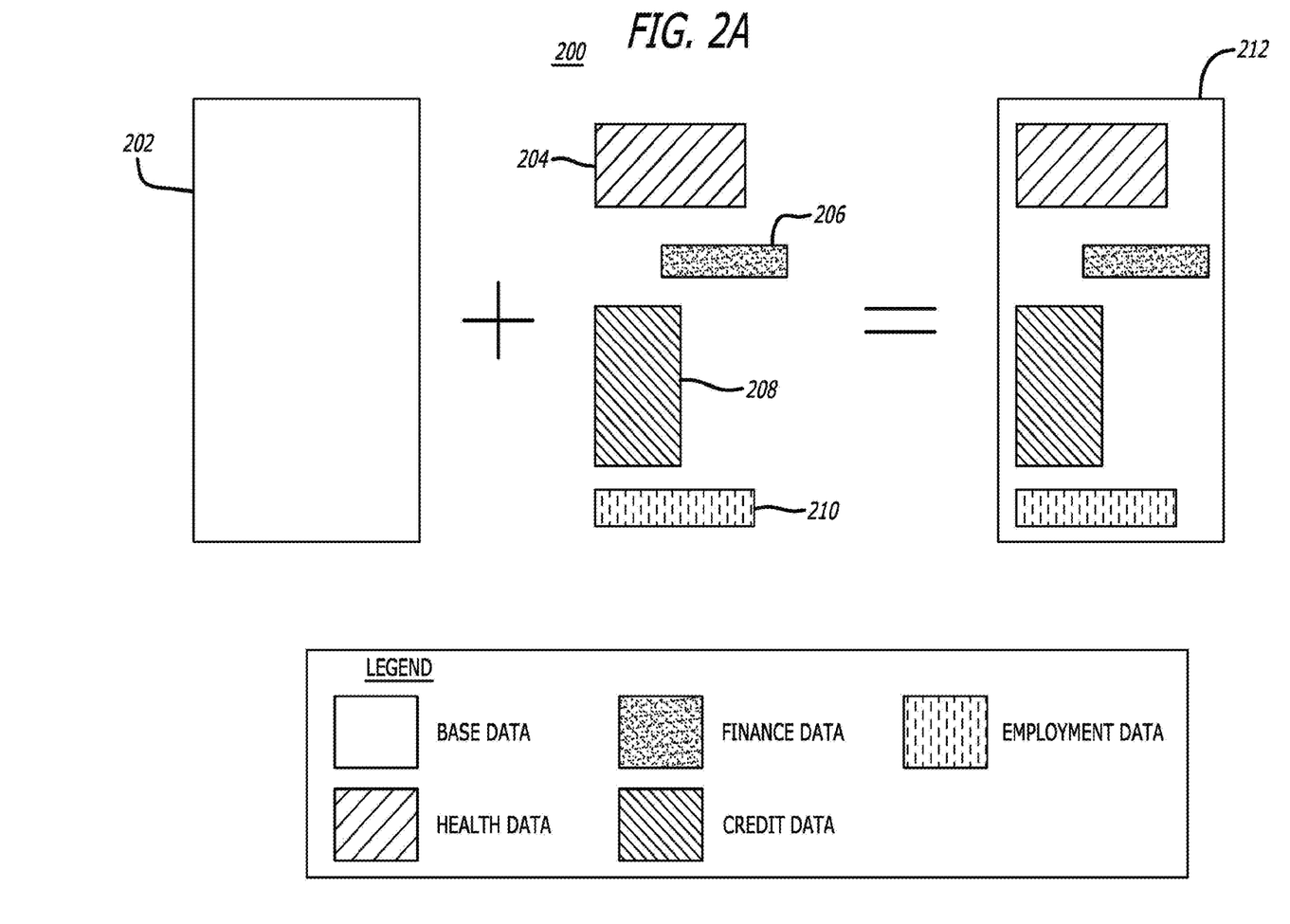
FIGS. 2A and 2B is an exemplary block diagram illustrating a flow of data through the LENS system of FIG. 1 during an encryption process in accordance with some embodiments.
Figure 2B:
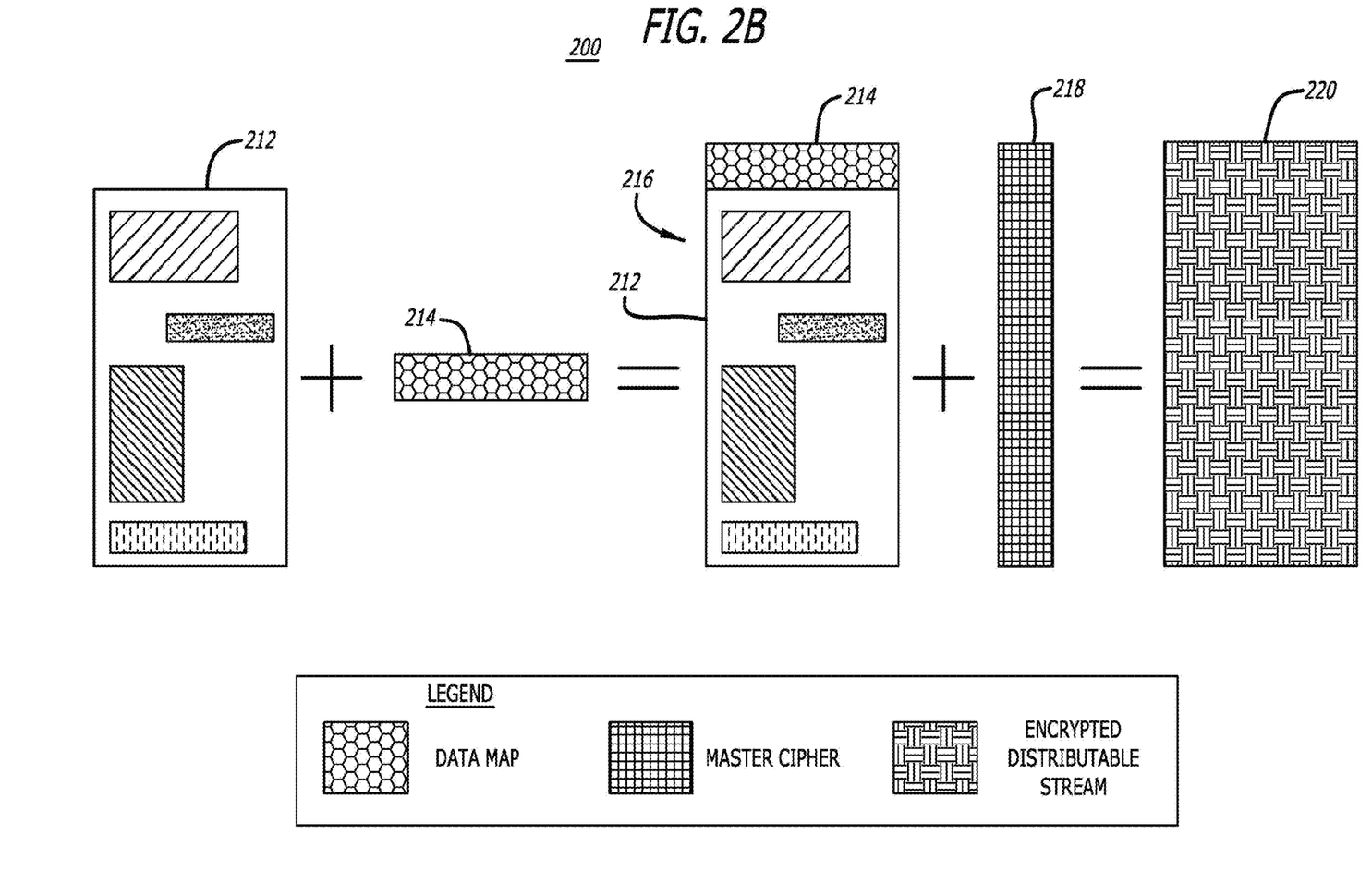

Referring now to FIGS. 2A-2B, an exemplary block diagram illustrating a flow of data through the LENS system 110 during a selective access encryption process is shown in accordance with some embodiments. The illustrative embodiment of FIGS. 2A-2B encrypts data that includes five data portions that are merged together to form a data stream. The five data portions include base data 202, health data 204, finance data 206, credit data 208 and employment data 210. It should be understood that other types of data may be utilized, including more or fewer components. As an example, the base data 202 may refer to an individual's personally identifying information (PII), which may include a name, a date of birth, an address, etc. The health data 204 may include the individual's medical records while the finance data 206 may include the individual's banking, investment, mortgage, etc., records. The credit data 208 may include the individual's credit history and credit score while the work data 210 may include the individual's employment records, resume, letters of recommendation, etc. In some embodiments, a single data stream is received by the LENS system 110 for encryption, wherein the LENS system 110 may parse the data stream to determine the data portions as discussed below. In other embodiments, as shown in FIG. 2A, individual data portions may be received separately and merged to form a data stream for encryption.

As in initial step, each of the data portions—base data 202, health data 204, finance data 206, credit data 208 and employment data 210—is encrypted by the LENS system 110 using specific keys for each data portion. As will be discussed below, the unique key corresponding to each data portion may be utilized by LENS system 110 to generate an initialization value (IV) as well as additive and substitution tables that are also utilized in the encryption process. FIG. 2A illustrates the merger of the encrypted data portions to form the data stream 212. In one embodiment, the merger may be combining the documents comprising the data stream into a single block of data. The merger may include appending the data portions together, inserting the all documents comprising the data portions into a block of data (e.g., intermixing the documents from various data portions), etc. Therefore, as each data portion was encrypted separately with specific, e.g., unique, keys, the merged data stream may be distributed—following further operations discussed below—to a plurality of third-parties, wherein each third-party is providing only the necessary keys to access the data portions to which they have access.

Referring now to FIG. 2B, the data flow 200 includes operations performed by the LENS system 110 of appending a data map 214 to the data stream 212 to form data block 216. The generation of the data map may be the result of operations performed by the data map generation logic 120 discussed below. For instance, the data map generation logic 120 may determine the location of a beginning of each data portion (assuming the documents of a data portions remain as a single during the merging of the data portion) and generates a data map indicating the beginning of each data portion according to an offset from the beginning of the first portion. Once the data map 214 has been appended to the data stream 212 to form the data block 216, the LENS system 110 may apply a master cipher 218 to the data block 216 to form an encrypted distributable stream 220. As referenced above, the encrypted distributable stream 220 may be distributed to a plurality of third-parties each being authorized to access only select data portions within the encrypted distributable stream 220. For instance, a medical professional may be provided selective access to the data map 214, the base data 202 and the health data 204 while a credit bureau is provided selective access to the data map 214, the base data 202 and the credit data 208. Importantly, the encrypted distributable stream 220 provides a single data source that an individual may provide to a plurality of third-parties, thus reducing the possibility of losing portions of one's data (e.g., a particular medical record). Specifically, when an individual has to keep track of a plethora of data objects, e.g., several medical records, several finance records, several credit records, it is easy to misplace one or more documents.

IV. First Selective Access Encryption Methodology

As a brief and general introduction to an encryption technique used in some embodiments, the EXCITE technique creates an initialization value (IV) through processing of a predetermined (e.g., random) value and one or more Deterministic Sequence Generator (DSG) seeds. The initialization value (IV) is processed with a user key to generate a set of initial DSG vectors and used by the LENS system 110, along with a user key, to generate an a set of initial DSG vectors. The initial DSG vectors are input into DSG logic, where the DSG logic produces a repeatable sequence of random numbers given a fixed set of initial parameters. The DSG logic, when executed by a processor, generates an additive table, a substitution table and an initial internal working key. In one embodiment, the EXCITE encryption technique, which is typically performed at a byte level, includes transforming each byte of plaintext using an additive table, an substitution table and an internal working key to perform the appropriate addition, XOR and substitution operations on the current byte of plaintext data.

As a first step in the illustrative technique, a byte of plaintext within a data stream is processed by adding the byte from the additive table modulus the input position, thus blinding the original plaintext data byte. Next, an XOR operation is then performed on this modified byte (from the first step) using the next byte of the working key to blind the above modified byte. Then, the correct substitution byte for this modified byte (from the second step) is determined. Following the substitution, the substitution byte is stored in the output stream to further blind the above modified byte. The above steps are repeated until the entire length of the working key has been used (a new working key is then generated and the process resumes) and the above process repeats until all bytes of the plaintext have been encrypted.

Figure 3A:
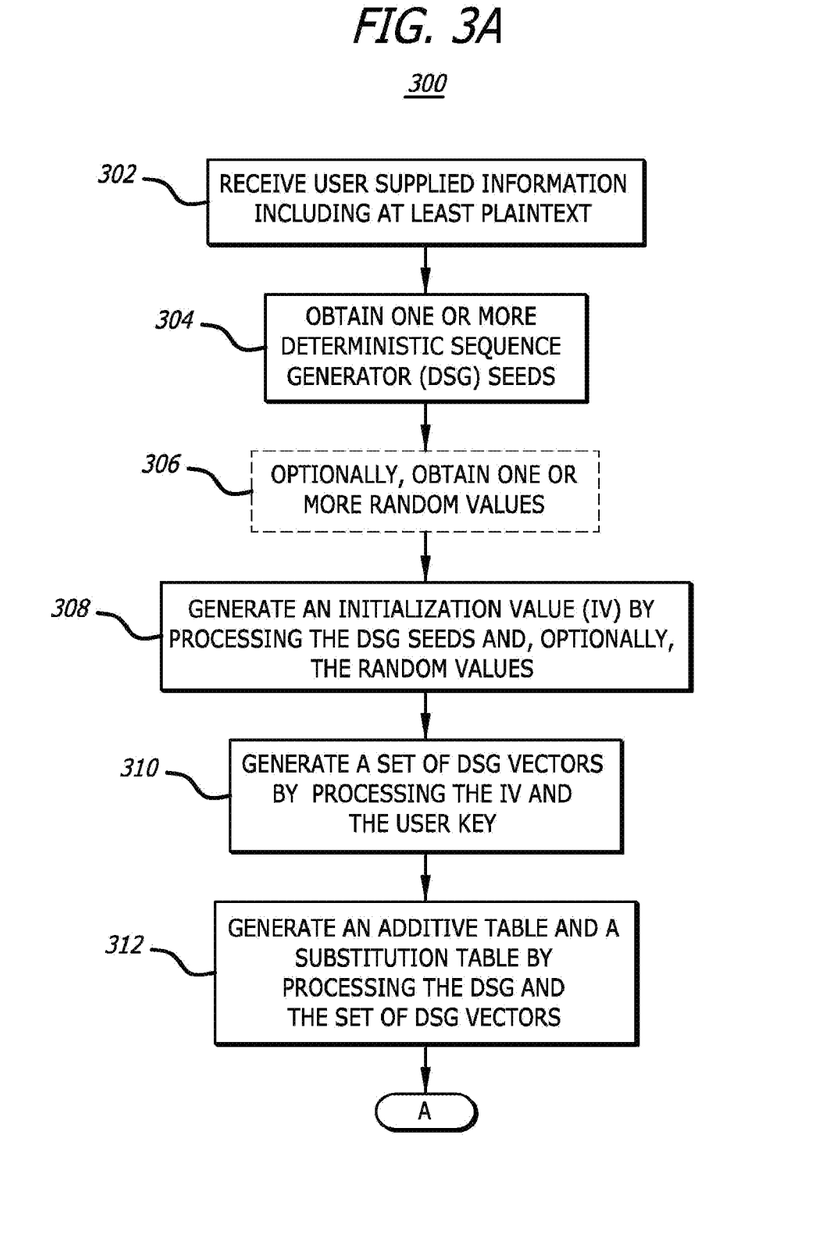
FIGS. 3A, 3B, and 3C provide a flowchart illustrating an exemplary method of a first encryption process performed by the LENS system of FIG. 1 in accordance with some embodiments.
Figure 3B:
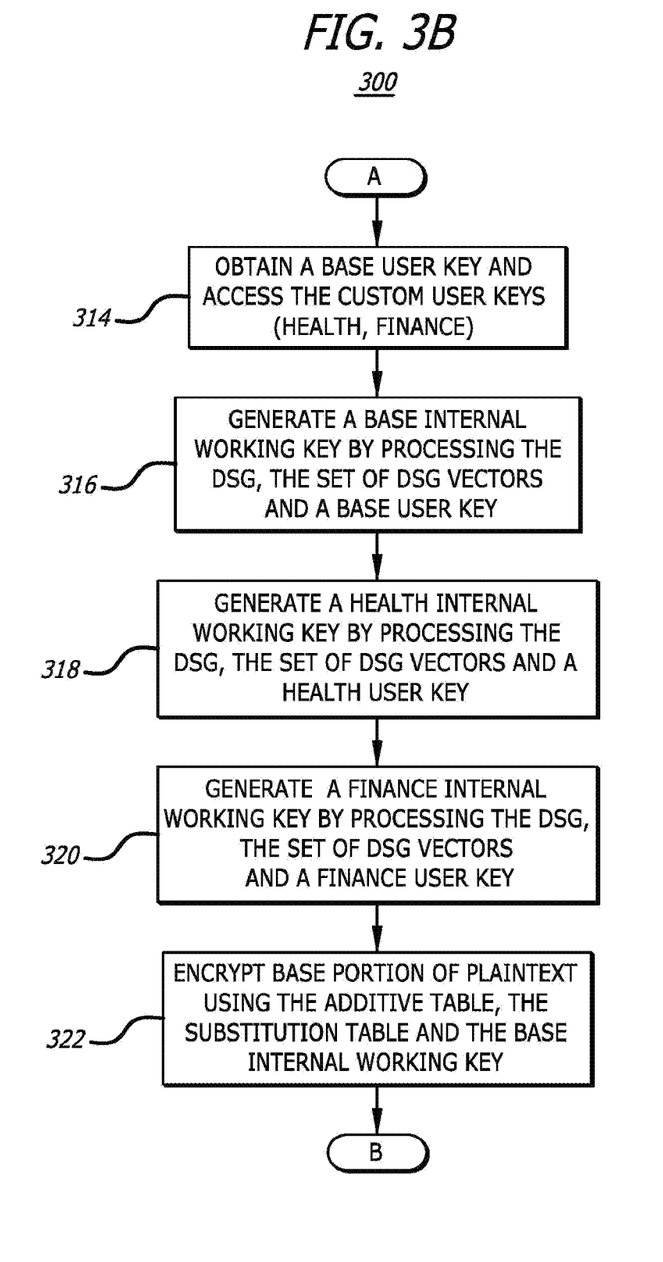
Figure 3C:
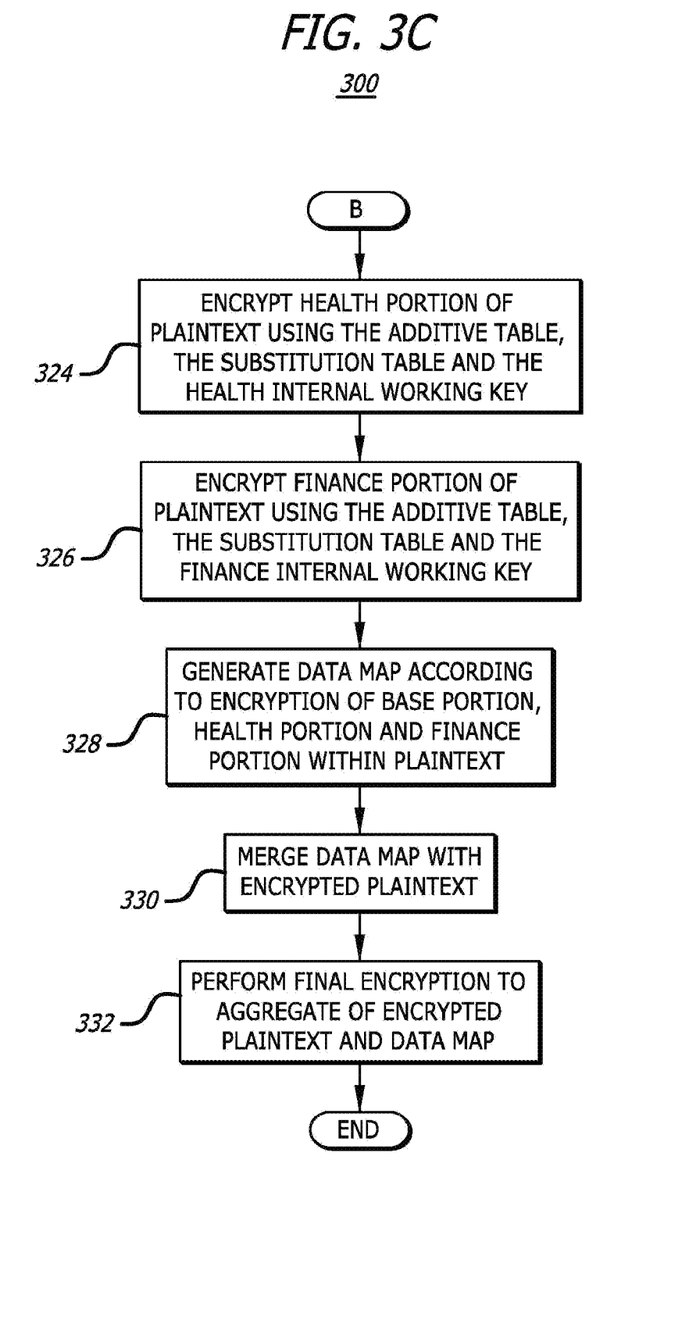

Referring now to FIGS. 3A-3C, a flowchart illustrating an exemplary method of a first encryption process performed by the LENS system 110 of FIG. 1 is shown in accordance with some embodiments. Each block illustrated in FIGS. 3A-3C represents an operation performed in the method 300 of encrypting a data stream via a first selective access encryption methodology by way of processing of logic modules comprising the LENS system 110 by one or more processors, e.g., the processor(s) 102 of FIG. 1. As an initial operation, the LENS system 110 receives information including at least a user supplied data stream (e.g., plaintext) to be encrypted (block 302). The information received from the user may also include a set of custom keys that are, in one embodiment, utilized by the LENS system 110 to generate custom internal working keys, as will be described below. For illustrative purposes only, and in no way limiting, one illustrative embodiment, the custom keys may include: (1) a base key for use in encrypting base data of the data stream, (2) a health key for encrypting health data within the data stream, and (2) a finance key for encrypting health data within the data stream. However, as each custom key corresponds to an information type within the data stream, other custom keys may be utilized.

In one embodiment, as is illustrated in FIG. 1, the user supplied information may be via a user interface 134 displayed on a network device that is communicatively coupled to the network/server device 100 on which the LENS system 110 is stored. In an alternative embodiment, the user supplied information may be obtained from alternative sources, such as from remote data stores and/or the data store 126. Additionally, the user supplied information may be obtained from multiple sources.

In response to receiving, or obtaining, the user supplied information, the LENS system 110 retrieves one or more DSG seeds 132 (block 304). The DSG seeds may be retrieved from a data store, e.g., the data store 126, or via the user interface 134 discussed above. The random values may be obtained through various sources, e.g., a random value generator, noise detected by Search for Extra Terrestrial Intelligence (SETI), etc. The DSG seeds and/or the random value may be accessed from other persistent storage (non-transitory, computer-readable medium) such as remote persistent storage, cloud computing services, etc.

As an optional operation, the LENS system 110 may obtain one or more random values that may be utilized in later operations (block 306). The random values may be obtained or retrieved from various sources, e.g., a random value generator, noise detected by Search for Extra Terrestrial Intelligence (SETI), etc. The random value may be accessed from other persistent storage (non-transitory, computer-readable medium) such as remote persistent storage, cloud computing services, etc. Additionally, in some embodiments, the random values may be merged to generate a single random value, wherein the merger may be any form of utilizing two numbers to obtain a third, e.g., any mathematical process, masking when applicable, etc.

Subsequently, the LENS system 110 generates an Initialization Value (IV) by processing the DSG seeds and, optionally, the random value(s) (block 308). Therefore, the IV is a derivative of the DSG vector. Following the generation of the IV, the LENS system 110 generates a set of DSG vectors by processing the IV, the user key and optionally the random values (block 310).

Subsequent to the generation of the IV and the set of DSG vectors, the LENS system 110 generates an additive table and a substitution table by processing DSG logic utilizing the set of DSG vectors as input (block 312). In some embodiments, the order of the creation of the additive table and the substitution table may be altered, i.e., the substitution table may be created before the additive table and vice-versa. However, the table creation order is to remain consistent during both the encryption and decryption process.

Referring now to FIG. 3B, the method 300 continues as the LENS system 110 obtains a base key and accesses the custom keys (e.g., health, finance) (block 314). The LENS system 110 may retrieve the base key and the custom keys from a persistent storage source such as the persistent storage 108 of FIG. 1, a remote persistent storage, cloud computing services, etc. In alternatively embodiments, the LENS system 110 may receive the base key along with the custom keys as discussed above. In some embodiments, the LENS system 110 may need to determine the information types included in the data stream for which to retrieve custom keys. In some embodiments, the data stream may comprise a plurality of documents with each document including header information that indicates the relevant information type. For example, a medical form may include header information that enables the LENS system 110 to determine the medical form is health data. In a second embodiment, the LENS system 110 may parse the data stream, e.g., each document or file included therein, and use machine learning techniques to automatically determine an information type for each document or file. In yet another embodiment, the LENS system 110 may receive an indication as to the information type of each document comprising the data stream (e.g., via user input, via a header to the data stream, via a secondary document indicating the contents of the data stream, etc.). In the illustrative example of FIGS. 3A-3C, the data stream includes three data portions, base data, health data and finance data.

Upon obtaining the base key, the LENS system 110 generates a base internal working key by processing the DSG logic, the set of DSG vectors and a base key (block 316). In some embodiments, each internal working key is a non-linear abstraction of the DSG vector and is rolled in time with its own exhaustion. Additionally in some embodiments, processing to generate the working key may including taking a deterministically random position from the DSG vector at runtime.

In a similar manner as above, upon obtaining the additional custom keys (e.g., health, finance), the LENS system 110 generates a (i) health internal working key by processing the DSG logic, the set of DSG vectors and the health key (block 318), and (ii) a finance internal working key by processing the DSG logic, the set of DSG vectors and the finance key (block 320).

Once the LENS system 110 has obtained the data stream, and generated the IV and the base internal working key, the LENS system 110 encrypts the base portion of the data stream using the additive table, the substitution table and the base internal working key (block 322). An overview of encryption using the EXCITE encryption technique is discussed above. Reference may be made to U.S. patent application Ser. No. 15/082,853, which has been incorporated herein by reference, for more detail regarding the encryption process using a generic additive substitution tables.

Similarly, once the LENS system 110 has obtained the data stream, and generated the IV and the health internal working key, the LENS system 110 encrypts the health portion of the data stream using the additive table, the substitution table and the health internal working key (block 324). Additionally, and in the same manner as discussed above with respect to the base and health portions of the data stream, once the LENS system 110 has obtained the data stream, and generated the IV and the finance internal working key, the LENS system 110 encrypts the finance portion of the data stream using the additive table, the substitution table and the finance internal working key (block 326).

Upon encrypting the contents of the data stream, that being the base portion, the health portion and the finance portion in the illustrative embodiment of FIGS. 3A-3B, the LENS system 110 generates a data map according to the encryption of the data stream (block 328). During the encryption process, the LENS system 110 may record the location of each document within the data stream along with its corresponding information type. In one embodiment, the LENS system 110 may record an offset from the beginning of the data stream for each document (the offset from the end may also be used, as well other any noted location within the data stream. The offset record may then be used to generate a data map of the data stream. The data map generation logic 120 of the LENS system 110 as seen in FIG. 1 may, upon execution, perform operations that record the offset of each document and generates the data map.

Subsequent to generating the data map, the LENS system 110 merges the data map with the encrypted data stream (block 330). In one embodiment, the data map is prepended to the encrypted data stream. In a second embodiment, the data map is appended to the encrypted data stream. The merging operation is performed by the data merging logic 118 of the LENS system 110 as seen in FIG. 1.

After the data map has been merged with the encrypted data stream to form a "merged data stream," the LENS system 110 performs a final encryption on the merged data stream (block 332). The final encryption, performed by the master cipher logic 122, may be any form of encryption, such as, but not limited or restricted to, the Advanced Encryption Standard (AES), the Triple Data Encryption Standard (3DES), Twofish, RSA, etc.

In addition to the encryption process illustrative in FIGS. 3A-3C, the LENS system 110 also includes key generation logic 124 that is configured to, upon execution, generate keys that each decrypt a specific portion of the data stream, e.g., a health key is configured to decrypt the health portion but not the finance portion. Using the example above in FIGS. 3A-3C, the key generation logic 124 generates the followings keys after encryption: (i) a data map key configured to decrypt the master cipher and the data map, thus providing access to the data map, (ii) a base key configured to decrypt the base portion, (iii) a health key configured to decrypt the health portion, and (iv) a finance key configured to decrypt the finance portion. In some embodiments, some of the keys may be merged into a single key for ease of distribution. For example, a third-party receiving the encrypted data stream that is to be authorized to decrypt the health portion, the third-party will be given either a set of keys including the data map key, the base key and the health key or a single key that merges (e.g., appending the keys to each other) the data map key, the base key and the health key.

Therefore, by encrypting the data stream and generating the requisite decryption keys, the LENS system 110 produces a highly encrypted data stream that may be distributed to a plurality of third-parties. Each third-party may be given a specific set of keys or singular key, that decrypts the portion(s) of the data stream to which it has authorization. It should be noted that in some instances, a master key may be generated that decrypts the entire data stream. Additionally, the some third-parties may be given authorization to multiple portions.

V. Second Selective Access Encryption Methodology

Figure 4A:
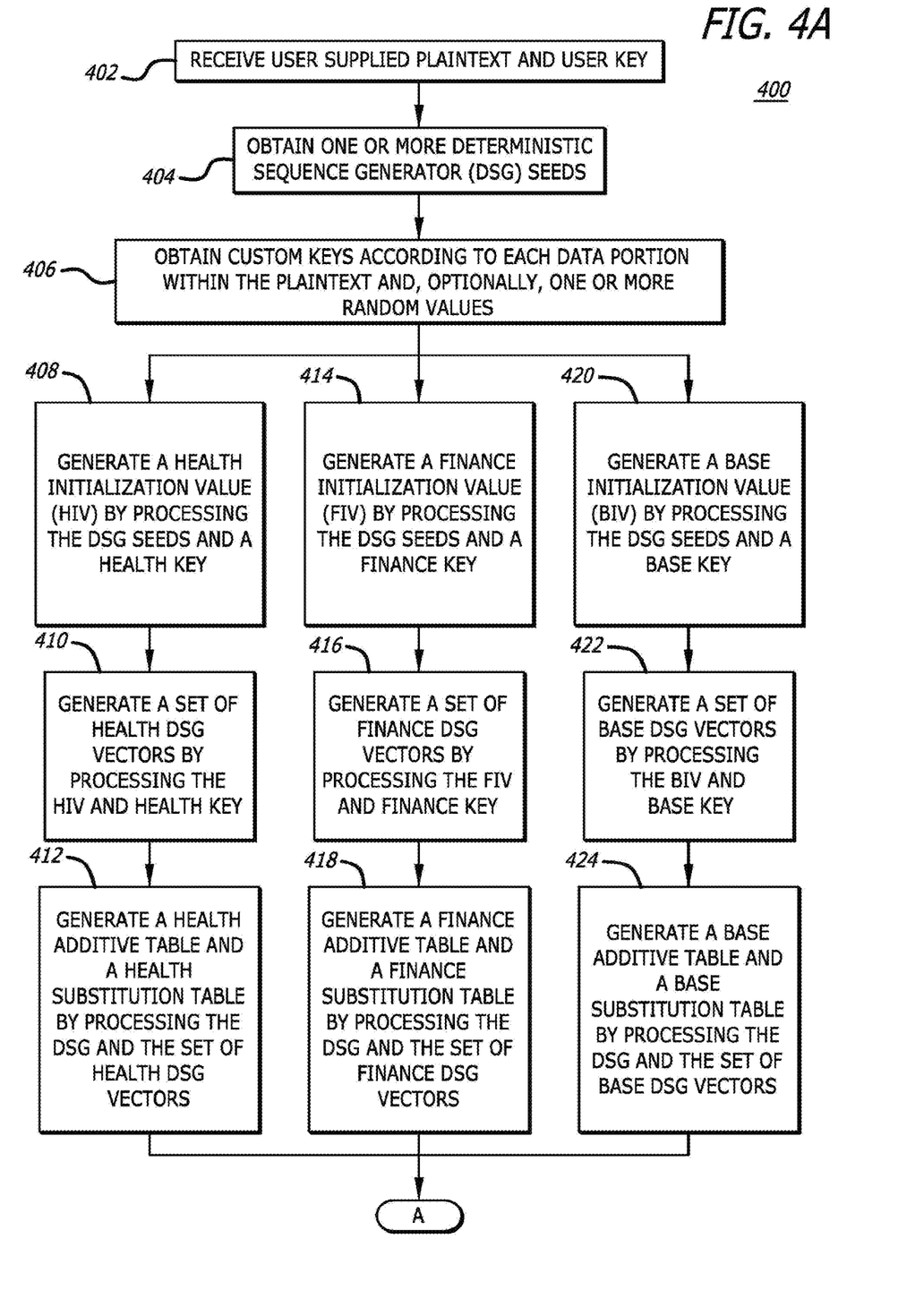
FIGS. 4A, 4B, and 4C provide a flowchart illustrating an exemplary method of a second encryption process performed by the LENS system of FIG. 1 in accordance with some embodiments.
Figure 4B:
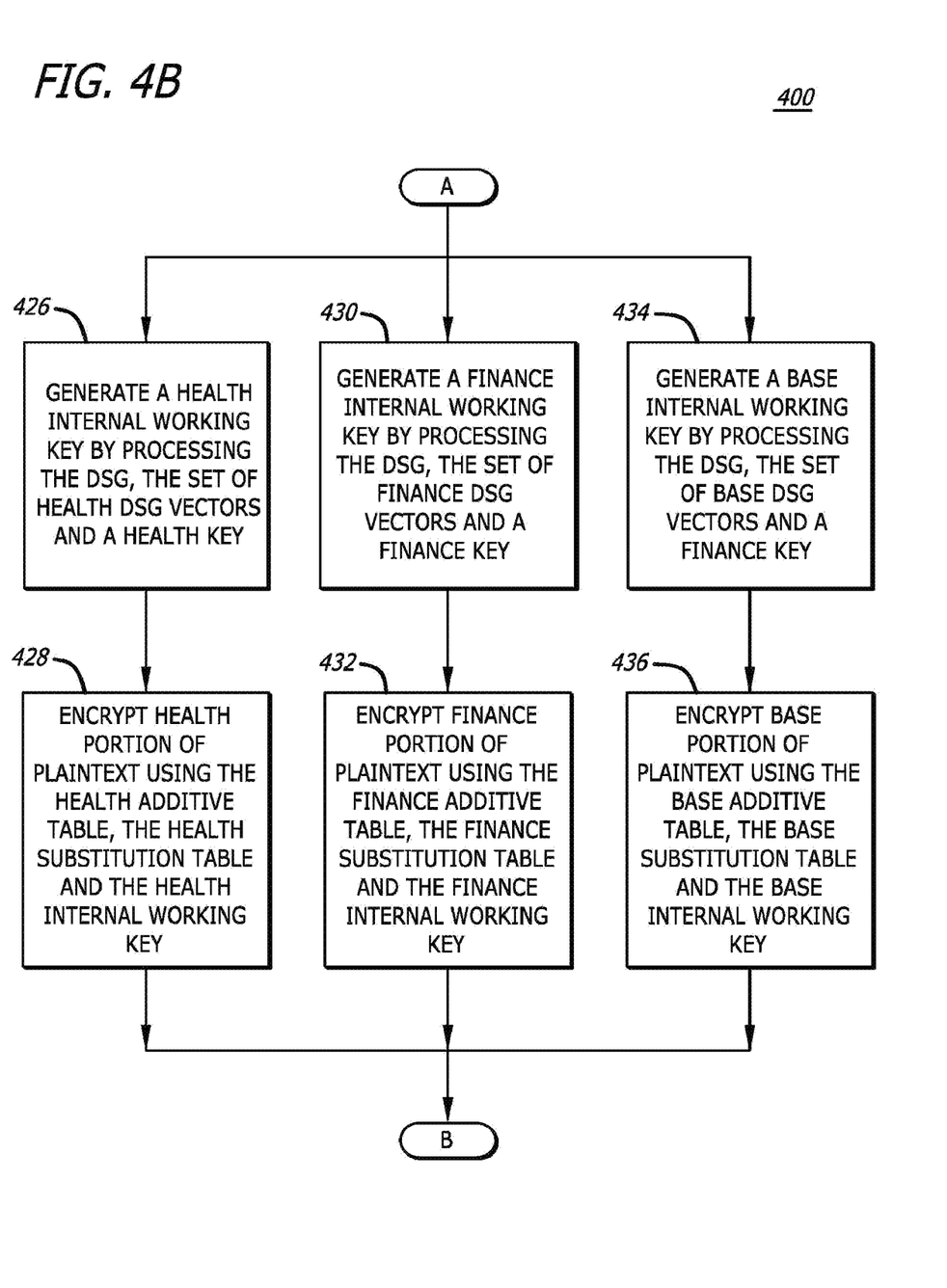
Figure 4C:
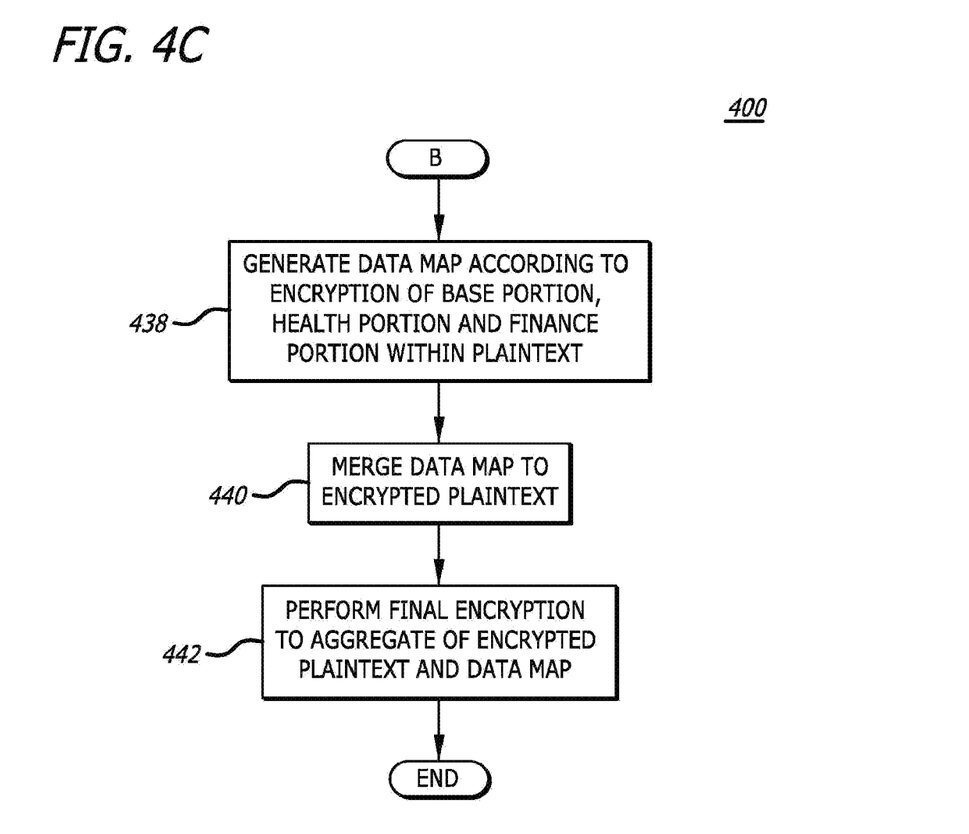

As discussed above in the first selective access encryption methodology directed to the use of a single initialization value (IV). In contrast, the first selective access encryption methodology is directed to the use of custom IVs for each set of data included in the data stream to be encrypted. Referring now to FIGS. 4A-4C, a flowchart illustrating an exemplary method of a second encryption process performed by the LENS system 110 of FIG. 1 is shown in accordance with some embodiments. Each block illustrated in FIGS. 4A-4C represents an operation performed in the method 400 of encrypting a data stream via a second selective access encryption methodology. As an initial operation, the LENS system 110 receives, or otherwise obtains, information including at least a user supplied data stream (e.g., plaintext) to be encrypted (block 402). In response to receiving, or obtaining, the user supplied information, the LENS system 110 retrieves one or more DSG seeds 132 (block 404).

Next and in contrast to the first selective access encryption methodology discussed above with respect to FIGS. 3A-3C, during the second selective access encryption methodology the LENS system 110 obtains a custom key for each data portion within the plaintext, and, optionally, one or more random values that may be utilized in later operations (block 406). However, first, the LENS system 110 may need to determine the information types included in the data stream to be encrypted as discussed above. The embodiment of FIGS. 4A-4C utilizes a similar embodiment as with FIGS. 3A-3C such that the data stream includes three data portions, base data, health data and finance data. Subsequently, the LENS system 110 generates custom Initialization Values (IVs) for each data portion within the data steam. The order of which each data portion is processed is not important and may be altered.

As shown in FIG. 4A, the LENS system 110 generates a health Initialization Value (IV) by processing the DSG seeds, the health key, and, optionally, the random value(s) (block 408). Next, the LENS system 110 generates a set of health DSG vectors by processing the health IV and the health key (block 410). Further, the LENS system 110 generates a health additive table and a health substitution table by processing the DSG and the set of health DSG vectors (block 412).

Additionally, the LENS system 110 generates a finance IV by processing the DSG seeds, the finance key, and, optionally, the random value(s) (block 414). Next, the LENS system 110 generates a set of finance DSG vectors by processing the finance IV and the finance key (block 416). Further, the LENS system 110 generates a finance additive table and a finance substitution table by processing the DSG and the set of finance DSG vectors (block 418). Similarly, the LENS system 110 generates a base IV with the DSG seeds and the base key (block 420), a set of base DSG vectors with the base IV and the base key (block 422) and additionally, a base additive table and a base substitution table the DSG and the set of base DSG vectors (block 424).

The LENS system 110 also generates a health internal working key by processing the DSG with the set of health DSG vectors and the health key (block 426). Further, the LENS system 110 encrypts the health portion of the plaintext using the health additive table, the health substitution table and the health internal working key (block 428).

The LENS system 110 generates a finance internal working key by processing the DSG with the set of finance DSG vectors and the finance key (block 430). Further, the LENS system 110 encrypts the finance portion of the plaintext using the finance additive table, the finance substitution table and the finance internal working key (block 432). The LENS system 110 generates a base internal working key by processing the DSG with the set of base DSG vectors and the base key (block 434). Further, the LENS system 110 encrypts the base portion of the plaintext using the base additive table, the base substitution table and the base internal working key (block 436). The encrypted data portions are then merged to create an encrypted data stream.

Following the encryption of the data portions comprising the data stream—the base portion, the health portion and the finance portion—and the creation of the encrypted data stream, the LENS system 110 generates a data map (block 438). The LENS system 110 then merges the data map with the encrypted data stream (440) and applies a final cipher to the merged encrypted data stream and the data map (block 442). The data map generation, the merging of the data map to the plain text and the final encryption are performed in a similar manner as discussed above.

In the foregoing description, the invention is described with reference to specific exemplary embodiments thereof. It will, however, be evident that various modifications and changes may be made thereto without departing from the broader spirit and scope of the invention as set forth in the appended claims. As mentioned above, while specific embodiments are described herein, the invention is not to be limited to these embodiments, the invention is to be understood as not limited by the specific embodiments described herein, but only by scope of the appended claims. Features and details from one or more described embodiments may also be combined, added or removed to form other embodiments within the scope of the invention, as the described embodiments are merely exemplary of various features.

What is claimed is:

1. A system comprising:
computer-readable memory storing executable instructions; and one or more processors in communication with the computer-readable memory and programmed by the executable instructions to:
  receive plaintext data to be encrypted prior to being provided to individual data accessors of a set of data accessors, the plaintext data comprising a plurality of data portions including a first data portion to be accessible by a first subset of data accessors, a second data portion to be accessible by a second subset of data accessors, and a base data portion to be accessible by the set of data accessors;
  obtain a plurality of keys, wherein a first key of the plurality of keys is associated with the first data portion, a second key of the plurality of keys is associated with the second data portion, and a base key of the plurality of keys is associated with the base data portion;
  encrypt the first data portion using the first key, the second data portion using the second key, and the base data portion using the base key to generate a plurality of encrypted data portions;
  generate a distribution key using the base key and the first key, wherein a data accessor in the first subset of data accessors is enabled to use the distribution key to decrypt a first encrypted data portion of the plurality of encrypted data portions to access the first data portion, and decrypt a base encrypted data portion of the plurality of encrypted data portions to access the base data portion; and
  merge the plurality of encrypted data portions to generate a single data stream.

2. The system of claim 1, wherein the one or more processors are further programmed by the executable instructions to:
  distribute, to a first data accessor of the first subset of data accessors, the single data stream, the base key, and the first key, wherein the second key is not distributed to the first data accessor; and
  distribute, to a second data accessor of the second subset of data accessors, the single data stream, the base key, and the second key, wherein the first key is not distributed to the first data accessor.

3. The system of claim 1, wherein the one or more processors are further programmed by the executable instructions to:
  analyze header information associated with the first data portion;
  determine, based on results of analyzing the header information, an information type associated with the first data portion; and
  obtain the first key based on the information type associated with the first data portion.

4. The system of claim 3, wherein the one or more processors are further programmed by the executable instructions to generate a first working key using the first key and a set of Deterministic Sequence Generator (DSG) vectors, wherein the first working key is associated with the first data portion.

5. The system of claim 4, wherein the one or more processors are further programmed by the executable instructions to:
  generate an initialization value from at least a set of DSG seeds; and
  generate the set of DSG vectors based at least partly on the initialization value.

6. The system of claim 1, wherein the one or more processors are further programmed by the executable instructions to:
  generate an initialization value from at least a set of Deterministic Sequence Generator (DSG) seeds; and
  generate an additive table and a substitution table based at least partly on the initialization value.

7. The system of claim 1, wherein to encrypt a first data portion of the plurality of data portions, the one or more processors are further programmed by the executable instructions to execute an additive operation on each byte of the first data portion using an additive table.

8. The system of claim 7, wherein to encrypt the first data portion, the one or more processors are further programmed by the executable instructions to execute an XOR operation on each byte of the first data portion as modified by the additive operation.

9. The system of claim 8, wherein to encrypt the first data portion, the one or more processors are further programmed by the executable instructions to execute a substitution operation using a substitution table on each byte of the first data portion as modified by the XOR operation.

10. A computer-implemented method comprising:
  under control of one or more computer processors configured to execute specific instructions,
    receiving plaintext data to be encrypted prior to being provided to individual data accessors of a set of data accessors, the plaintext data comprising a plurality of data portions including a first data portion to be accessible by a first subset of data accessors, a second data portion to be accessible by a second subset of data accessors, and a base data portion to be accessible by the set of data accessors;
    obtaining a plurality of keys, wherein a first key of the plurality of keys is associated with the first data portion, a second key of the plurality of keys is associated with the second data portion, and a base key of the plurality of keys is associated with the base data portion;
    encrypting the first data portion using the first key, the second data portion using the second key, and the base data portion using the base key to generate a plurality of encrypted data portions;
    generating a distribution key using the base key and the first key, wherein a data accessor in the first subset of data accessors is enabled to use the distribution key to decrypt a first encrypted data portion of the plurality of encrypted data portions to access the first data portion, and decrypt a base encrypted data portion of the plurality of encrypted data portions to access the base data portion; and
    merging the plurality of encrypted data portions to generate a single data stream.

11. The computer-implemented method of claim 10, further comprising:
  distributing, to a first data accessor of the first subset of data accessors, the single data stream, the base key, and the first key, wherein the second key is not distributed to the first data accessor; and
  distributing, to a second data accessor of the second subset of data accessors, the single data stream, the base key, and the second key, wherein the first key is not distributed to the first data accessor.

12. The computer-implemented method of claim 10, further comprising:
  analyzing header information associated with the first data portion;

determining, based on results of analyzing the header information, an information type associated with the first data portion; and obtaining the first key based on the information type associated with the first data portion.

13. The computer-implemented method of claim 12, further comprising generating a first working key using the first key and a set of Deterministic Sequence Generator (DSG) vectors, wherein the first working key is associated with the first data portion.

14. The computer-implemented method of claim 13, further comprising:

generating an initialization value from at least a set of DSG seeds; and generating the set of DSG vectors based at least partly on the initialization value.

15. The computer-implemented method of claim 10, further comprising:

generating an initialization value from at least a set of Deterministic Sequence Generator (DSG) seeds; and generating an additive table and a substitution table based at least partly on the initialization value.

16. The computer-implemented method of claim 10, wherein encrypting a first data portion of the plurality of data portions comprises executing an additive operation on each byte of the first data portion using an additive table.

17. The computer-implemented method of claim 16, wherein encrypting the first data portion further comprises executing an XOR operation on each byte of the first data portion as modified by the additive operation.

18. The computer-implemented method of claim 17, wherein encrypting the first data portion further comprises executing a substitution operation using a substitution table on each byte of the first data portion as modified by the XOR operation.

* * * * *